United States Patent [19]
Rieger et al.

[11] Patent Number: 5,410,357
[45] Date of Patent: Apr. 25, 1995

[54] SCAN CONVERTER AND METHOD

[75] Inventors: James L. Rieger; Sherri L. Gattis, both of Ridgecrest, Calif.

[73] Assignee: The United States of America as represented by the Secretary of the Navy, Washington, D.C.

[21] Appl. No.: 45,159

[22] Filed: Apr. 12, 1993

[51] Int. Cl.$^6$ ............................................. H04N 7/01
[52] U.S. Cl. ..................... 348/458; 348/446; 348/448
[58] Field of Search ............... 348/458, 459, 443, 448, 348/446; H04N 7/01

[56] References Cited

U.S. PATENT DOCUMENTS

| | | | |
|---|---|---|---|
| 4,872,054 | 10/1989 | Gray et al. | 358/148 |
| 5,229,853 | 7/1993 | Myers | 348/458 |

Primary Examiner—Victor R. Kostak
Attorney, Agent, or Firm—Harvey A. Gilbert; Melvin J. Sliwka; John L. Forrest, Jr.

[57] ABSTRACT

A scan converter processes an input video signal having a fixed number of scan lines per frame, a horizontal synchronization rate and a vertical synchronization rate on an input video line to produce an output video signal having a predetermined number of scan lines per frame and a selected number of pixels per line on a video output line. The scan converter locks to the vertical synchronization rate of the input video signal to make the output video signal have a vertical synchronization rate equal to the vertical synchronization rate of the input video signal. The output horizontal rate is determined by multiplying the vertical synchronization rate by the predetermined number of scan lines per frame in the output video signal. The input horizontal synchronization rate is multiplied by the selected number of pixels per line to produce a WRITE pointer signal for writing input picture lines into a memory. The output horizontal rate is multiplied by the selected number of pixels per line to produce a READ pointer signal for reading picture lines of the output video signal out of the memory.

14 Claims, 1 Drawing Sheet

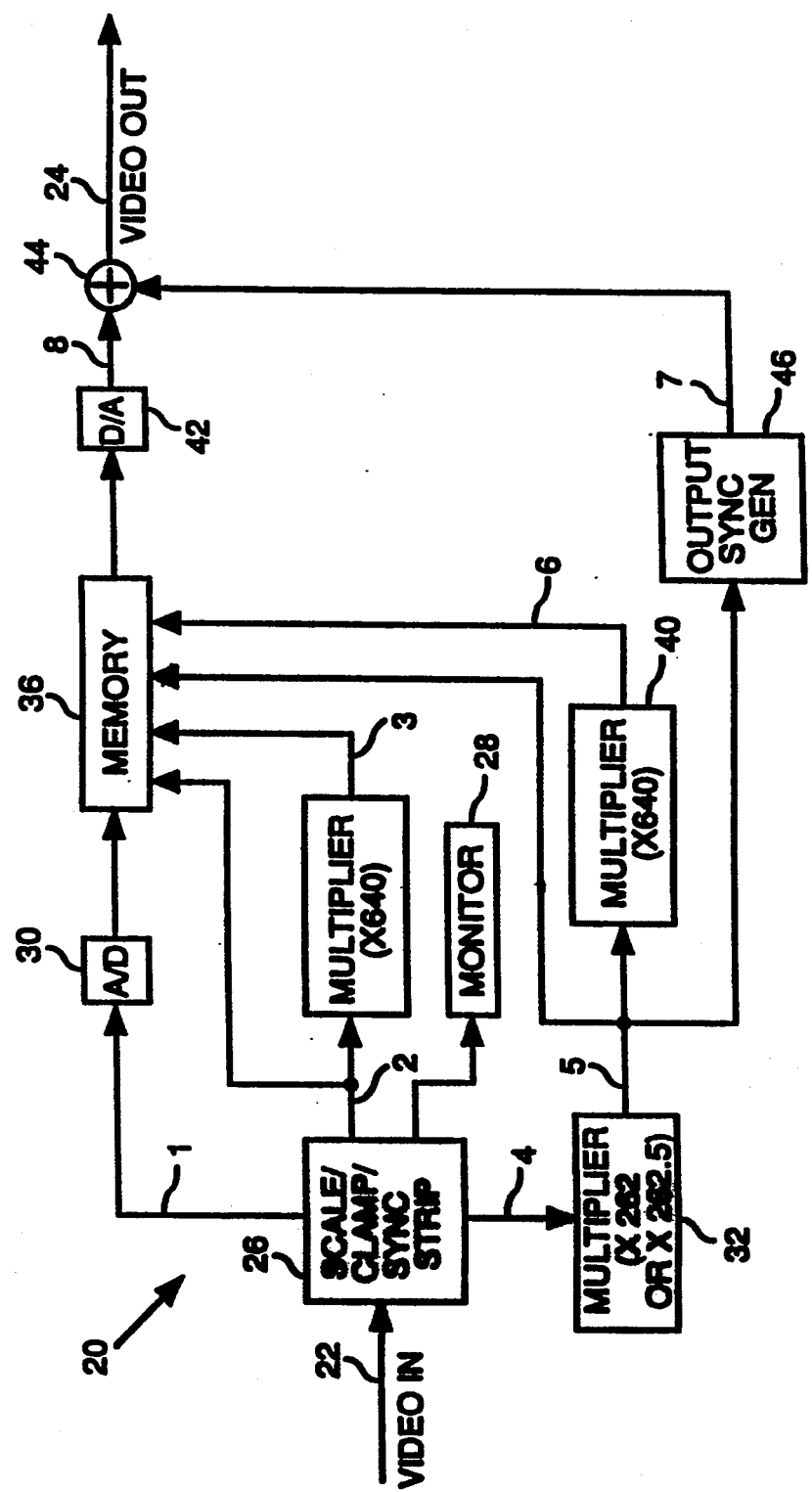

SCAN CONVERTER AND METHOD

BACKGROUND OF THE INVENTION

1. Field of the Invention

This invention relates generally to video signal processing and particularly to video signal processing systems and methods for converting an incoming video signal to an output having a standard NTSC 525-line interlaced or non-interlaced picture.

2. Description of the Prior Art

Video signals having 525, 675 and 875 horizontal scan lines are used in various commercial, industrial and military applications. Previous video signal processing circuitry is designed to operate with a single input horizontal scan line rate. Therefore, a video system designed for a 525 line rate is unusable with a 675 line signal.

Previous video scanners have the disadvantage of requiring storage of an entire picture sweep or more and require a relatively large amount of memory. A typical system must store at least as many lines as the lesser of the number of lines in the vertical sweep of the input or the output. For standard NTSC signals typical systems store at least 240 picture lines. The necessity of storing an entire picture sweep causes a delay of 6 to 24 msec between input and output signals. The delay between input and output signals is important in systems where the content of the picture is used to direct some action. The problem with the delay between input and output is analogous to driving an automobile while watching out the window what happened a second or so earlier.

SUMMARY OF THE INVENTION

An object of the present invention is to convert an input video signal having a first number of scan lines per frame, a horizontal synchronization rate and a vertical synchronization rate on an input video line to an output video signal having a predetermined number of scan lines per frame and a selected number of pixels per line on a video output line. The present invention provides a scan converter which converts any incoming signal within a specified range to an output with a standard NTSC 525-line interlaced or non-interlaced picture. The unit operates with a very small memory, which can be as small as three video lines. The output is in vertical synchronization with the input, and throughput delay can be as little as one line (approximately 63.5 microseconds).

A scan converter according to the present invention accommodates any nonstandard input picture line rate over a given range and converts it to an interlaced or non-interlaced NTSC standard picture for transmission, recording, or viewing on a standard monitor or TV receiver. The scan converter according to the present invention has the advantage of being capable of rapidly switching from one input rate to another.

The present invention processes incoming video signals by first locking to the vertical synchronization rate of the input video signal to make the output video signal have a vertical synchronization rate equal to the vertical synchronization rate of the input video signal. The output horizontal rate is determined by multiplying the vertical synchronization rate by the predetermined number of scan lines per frame in the output video signal. The input horizontal synchronization rate is multiplied by the selected number of pixels per line to produce a WRITE pointer signal for writing input picture lines into a memory. The output horizontal rate is multiplied by the selected number of pixels per line to produce a READ pointer signal for reading picture lines of the output video signal out of the memory.

An appreciation of the objectives of the present invention and a more complete understanding of its structure and method of operation may be had by studying the following description of the preferred embodiment and by referring to the accompanying drawing.

BRIEF DESCRIPTION OF THE DRAWING

The figure is a block diagram of the invention.

DESCRIPTION OF THE PREFERRED EMBODIMENT

The figure illustrates a scan converter 20 according to the present invention and indicates a video signal input line 22 and a video signal output line 24. The video signal input may be either a 525-, 675-, or 875-line, 60-field picture. However, video input signal may have any number of lines within a broad range as explained subsequently.

The video signal input is a television picture whose vertical sweep rate is approximately 60 Hz. The horizontal sweep rate is an integer multiple of the vertical sweep rate if the picture is not interlaced. For an interlaced signal the horizontal sweep rate is an integer and a half (e.g. 262.5) multiple of the vertical sweep rate. The input signal also may be random interlaced with the horizontal sweep rate being several hundred times the vertical sweep rate. Whatever the horizontal sweep rate is, the scan converter 20 must synchronize an oscillator to it as explained subsequently.

The video signal input is in a non-composite source format and is applied to an input terminal of a scale/clamp/sync strip circuit 26, which separates the video input signal into components needed in operation of the other components of the scan converter 20. The basic functions of the scale/clamp/sync strip circuit 26 are well-known in the video signal processing art and are discussed after the following description of the types of signals that are transmitted between the various components of the scan converter 20.

There are several different types of signals that are carried by the connections between the various components of the scan converter 20. For convenience in describing the components and their functions, the connections between the components are given numerical designations. The types of signals associated with the numerical designations are given below:

| SIGNAL NO. | SIGNAL DESCRIPTION |
| --- | --- |
| 1 | Non-composite video in source format. |
| 2 | Horizontal synchronization at input frequency for start-of-line indicator. |
| 3 | N times (640 times shown) horizontal frequency for WRITE pointer. |
| 4 | Vertical synchronization (derived from input, used in output) |
| 5 | Horizontal rate for output (interlaced or non-interlaced). Contention with WRITE register pointer for selecting READ register. |
| 6 | N times output horizontal clock rate (READ pointer). |
| 7 | Synchronization for output. |
| 8 | Non-composite video at output rate. |

In this disclosure the signals are identified by the above numbers and the corresponding descriptive terms. All signals without one of the above described numerical designators are parallel binary signals.

The scale/clamp/sync strip circuit 26 makes adjustment to the gain and voltage offset ("pedestal") of the video signal input. The scale/clamp/sync strip circuit 26 preferably includes a differential buffer amplifier (not shown) that removes any common-mode voltages that might be present in the video signal input. The differential buffer amplifier terminates the input line 22 in a selected impedance, which will normally be 75Ω, 93Ω, 124Ω or a high impedance bridge circuit (not shown). The differential buffer amplifier portion of the scale/clamp/sync strip circuit 26 also scales the voltage of the video signal input to produce a scaled video signal for internal use in the scan converter 20. This scaled video signal preferably has a voltage of about 1.4 $V_{pp}$.

This scaled, ground-referenced signal may be fed to a monitor 28 for viewing the incoming signal. The monitor 28 must be capable of accommodating the signal line rate of the video signal input.

The scale/clamp/sync strip circuit 26 extracts vertical synchronization and timing signals 4 and horizontal synchronization and timing signals 2. The scale/clamp/sync strip circuit 26 also produces the video signal 1, which is essentially the video signal input minus the synchronization information. The video signal 1 is output from the scale/clamp/sync strip circuit 26 and input to an analog-to-digital converter 30. Many of the functions of the scale/clamp/sync strip circuit 26 are preferably performed by an integrated circuit (not shown) such as a National Semiconductor (or equivalent) LM 1881 integrated circuit that is included in the scale/clamp/sync strip circuit 26. The functions of the scale/clamp/sync strip circuit 26 are well-known in the video signal processing art.

The scaled video signal is fed internally in the scale/clamp/sync strip circuit 26 to the LM 1881 integrated circuit. The integrated circuit removes synchronization signals and provides a voltage corresponding to a blanking level, which is used to produce a near-zero to one-volt range at the output for an analog-to-digital converter 30. The output signal is in vertical synchronization with the input, and delayed in phase by a small, fixed number of lines. The delay is typically two lines delay with decimation and 3 to 10 lines with any type of interpolation. The integrated circuit also produces a 60-Hz signal corresponding to the vertical sweep rate of the incoming signal video signal input regardless of the number of lines in the video signal input. In addition the integrated circuit produces a field/frame reset during vertical blanking.

The scale/clamp/sync strip circuit 26 has outputs connected to a frequency multiplier 32 and a frequency multiplier 34. The frequency multipliers used in the scan converter 20 are preferably phase locked oscillators used as frequency generators.

The scale/clamp/sync strip circuit 26 provides the signal 1 in non-composite video signal in source format to the analog-to-digital converter 30. The analog-to-digital converter 30 has an output terminal that provides synchronization signals that are input to a memory 36. The memory 36 also receives from the scale/clamp/sync strip circuit 26 the signal 2, which is the horizontal synchronization signal at the video signal input frequency that functions as a start-of-line indicator.

The frequency multiplier 32 receives the vertical synchronization signal 4. In the embodiment shown, the frequency multiplier 32 multiplies frequencies input thereto by a factor of either 262 or 262.5, depending upon whether the signal is non-interlaced or interlaced, respectively. The output of the frequency multiplier 32 is the signal 5 for the horizontal rate for the video signal output. The signal 5 is input to a multiplier 40 and to an output synchronization generator 46.

The frequency multipliers 32 and 40 multiply the vertical repetition rate to produce pixel clocks and counters. The NTSC pixel clock (and thus the output) can be made to operate in either interlaced or non-interlaced mode. The factor used in the multiplication determines the number of pixels per line. The number of pixels per line is the number in the entire line, not just the unblanked portion. The signal 6 output from the frequency multiplier 40 is input to the memory 36.

In the example illustrated in the figure, the number selected is 640 pixels per line, which exceeds the number necessary for a 4.2 MHz bandwidth picture. For these values, the output frequency of the frequency multiplier 40 is nominally 60×262×640=10.0608 MHz. Accuracy is controlled by the accuracy of the incoming 60 Hz vertical frequency. For an interlaced output, the 262 factor would become 262.5.

If 533 pixels per line were used, 4.2 MHz would be obtained. The higher number of pixels per line is preferred to prevent interaction with downstream processing of the signal without low pass filtering, but any number is possible.

The frequency multiplier 34 multiplies the horizontal repetition rate of the input by 640. A reset pulse is generated in the horizontal blanking interval, so that the active portion of the incoming picture line always begins and ends at the same count. It is not critical what those counts are. The count will vary with the line rate at the input and with timing tolerances in individual systems. For a 875-line input picture, the frequency multiplier 32 would need to operate at a frequency of 30×875×640=16.8000 MHz.

For a 511-line input picture, the frequency of the output signal of the frequency multiplier 34 would have a frequency of 511×30×640=9.811200 MHz. In this case there is a range slightly greater than 3:2 but less than 2:1. If very specific frequencies were guaranteed, the single wide-range frequency multiplier 34 could be replaced by one or more narrow-range oscillators (not shown) operating at frequencies determined in this way, and selected by the incoming-signal line counter. This technique is not used in the illustrated preferred embodiment of the invention, because incoming signal tolerances are expected to be quite wide.

Referring to the figure, the signal 3 having a frequency N times the horizontal frequency is supplied to the memory 36 by the frequency multiplier 34 for the WRITE pointer. In the figure N is 640. The frequency multiplier 32 provides the horizontal rate signal 5 to the memory 36.

The output of the memory is input to a digital-to-analog converter 42. The digital-to-analog converter 42 produces a non-composite video signal, which is applied to a first input of an analog summer 44. The analog summer 44 receives signals from an output synchronization generator 46 as a second input. The output synchronization generator 46 receives as an input the horizontal rate signal from the frequency multiplier 32.

A set of counters may be connected to the 10.0608 MHz frequency multiplier 40 and reset by the vertical reset pulse. The counter up to determine if the incoming signal is within the range of a 524- or 525-line picture, in which case the system is bypassed. The scan converter 20 may also be configured so that a 524-line (non-interlaced) picture is passed through unaltered and a 525-line picture processed and de-interlaced (or vice versa).

The frequency multiplier 40 drives the enable line of a fast analog-to-digital converter and counters operating at the second oscillator rate and reset by the input horizontal reset signal stuff the parallel signal generated by the incoming video into the digital memory 36. The memory 36 may be either a random-access or a first-in-first-out (FIFO) serial memory. In either case, each memory unit stores exactly one line of the incoming video signal. When a line is read into memory 36, a pointer (not shown) advances, and the next line is stuck into a second memory. When the last line memory is filled, the process starts again with the first line memory, replacing any previous data that may remain there. The minimum number of line memories for a decimation system is three, but four are preferred. The minimum number of line memories for an interpolating system is four, but about ten is optimum. In either case, the memory requirements are far short of the 262-line memory required for a noninterlaced signal, and 525-line memory needed for an interlaced system.

Actually, the number of lines is irrelevant, as long as it is within the range that the LM 1881 can accommodate, which is from below 405 lines to over 1000. The system 20 will accommodate even an input signal with an unknown number of lines if the input signal frequency multiplier has wide enough latitude to cover the range. If an input line rate lower than the output line rate is required, some additional complexity in determining the position of the read pointer is required.

For inputs that have fewer lines than the desired output rate, some lines must be read twice. The pointer for reading when line rate is higher at the input than the output is always reading the oldest complete line in the memory 36 to prevent a clash between read and write pointers because the write pointer is operating at a faster rate than the read pointer. When the input line rate is lower than the output rate, the read pointer reads instead the most recent line written and complete in memory. This is the only change necessary. The relation between the input line rate and the output rate can be determined by comparing the pixel clock frequencies of input and output.

The synchronization pulses required on the output can be the synchronization pulses from the input that have been stored and sent at the new line rate, or added at the output after digital-to-analog conversion. This is because the signal is stored only between the range of zero to +100 IRE units, which is called a "non-composite signal."

The read and write pointers read in and write out the picture line information, with the same number of pixels in an incoming line as an outgoing line, and without changing the proportions in the blanking intervals. The pointer for a higher number of lines operates at a faster rate than the one for the lower number of lines, which may be either the input or output. It is desirable for no memory to be written into and read out of at the same time, to prevent one pointer overtaking the other. Consequently, the write pointer is such that the memory units (three minimum, more for the interpolation system) writes in the line memories in sequence 1, 2, ... n, 1, 2, ..., and the read pointer reads the last complete line written in the memories. With three lines, the maximum ratio between lines in the input and output is two, hence the system as described here could convert any system with 263-1049 lines to 525-line pictures, e.g.

When interpolation is used instead of decimation, where entire lines are dropped or repeated, the minimum number of lines in memory necessary for operation is three. If four or more lines are used, the output can consist of a mixture (or matrix) of the stored complete lines. The output pointer reads simultaneously from the most recently written line and one or more that precede it. Therefore, if three lines are read simultaneously, at least five lines of storage capacity are required in the system, etc.

The mixture of two lines consists of the average of the two last lines written, weighted by how recently the line was written. Mixtures of three lines or more take the weighted average of the center line (or two lines), along with a subtraction of the next-most adjacent lines, etc. resembling a $$\text{sinc}(x) = \frac{\sin(x)}{x}$$

reconstruction, or other appropriate operator.

Extension of the system to color requires demodulation of the color signal on the incoming signal and either reconstruction of the color signal on the outgoing signal or presentation of the output signal as an RGB signal, as dictated by the requirement. The color signal is stored in the memories as a luminance signal of the desired resolution, and two chrominance signals, generally of lower horizontal and amplitude resolution.

A unique feature of the scan converter 20 is that because the vertical synchronization signal of the video input signal establishes the vertical sweep for both the input and output, delay is minimized and can be as little as one or two lines (50 to 200 msec) rather than hundreds of lines. The scan converter 20 provides the advantages of:

1. Handling inputs with more or fewer lines than desired at the output;
2. Interpolating lines for a smoother picture and to preserve or enhance vertical details;
3. Continuing to operate even if the number of line in the input changes; and
4. Interlacing a noninterlaced picture or deinterlacing an interlaced picture by selection of the ratio between the horizontal sweep rates.

Each horizontal line of a picture (except those involved in vertical synchronization) includes a horizontal synchronization pulse and a line of picture. It is not necessary to store or recover the synchronization pulse, but it is necessary to store the "active" portion of each picture line for conversion. Each storage line should start on the left edge of the picture. The line buffer is then filled with the picture by an oscillator and a start pointer driven by the horizontal synchronization pulse of the input signal. This results in a memory line being filled with a picture line. The memory is written with an oscillator that is a multiple of the horizontal line rate as a consequence of the use of the phase-locked multiplier driven by the input horizontal oscillator. Therefore, a memory line holds exactly one picture line, regardless of the actual line repetition rate, so long as the frequency is within a range that can be tracked by the frequency of the multipliers 32 and 34.

The multiplication for a line buffer containing 640 picture elements, or pixels, is greater than the number of pixels in the buffer because of the picture portion of the line being less than the total time duration of the line. The multiplication and the number of pixels stored are parameters under the control of the circuit designer. The exemplary embodiment has 640 pixels, to make the pixels square in a 640×480 display, which resembles a good standard NTSC television picture. The optimum number of pixels in many cases is about 4/3 in an interlaced picture.

When the first input picture line is received, it is stored in a memory line. When the next input picture line is received, it is stored in the next memory line. When the last memory line is written, the first memory line is overwritten again. There can be as few as three memory lines that are to be stored at any time. Multi-line interpolation at the output requires (n+2) buffers where n is the number of lines being interpolated. When n=1, there is no interpolation, and only three storage lines are needed in the memory 36.

Although the input has a line rate that is not the desired value, there is a requirement that the output signal have a specified number of lines per picture. The input signal has a vertical rate that is within allowable tolerances. The scan converter 20 uses the vertical rate from the input picture to establish the vertical rate in the output. There is a specified number of lines in the output. The scan converter 20 multiplies the vertical rate by that specified number to obtain the output horizontal rate. The scan converter 20 then multiplies the horizontal rate by the same number that the input horizontal rate was multiplied by and uses the resulting frequency to read the last line in the memory that was written. If interpolation is used, the last line written and the number of previously written lines are read. Because the scan converter 20 does not store the synchronization pulses from the incoming picture, the scan converter 20 generates new synchronization pulses in the scale/clamp/sync strip circuit 26.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is now claimed:

1. A method for converting an input video signal having a first number of scan lines per frame, a horizontal synchronization rate and a vertical synchronization rate on an input video line to an output video signal having a predetermined number of scan lines per frame and a selected number of pixels per line on a video output line, comprising the steps of:
    (a) locking to the vertical synchronization rate of the input video signal to make the output video signal have a vertical synchronization rate equal to the vertical synchronization rate of the input video signal;
    (b) determining an output horizontal rate by multiplying the vertical synchronization rate by the predetermined number of scan lines per frame in the output video signal;
    (c) multiplying the input horizontal synchronization by the selected number of pixels per line to produce a WRITE pointer signal for writing input picture lines into a partial frame line memory; and
    (d) multiplying the output horizontal rate by the selected number of pixels per line to produce a READ pointer signal for reading picture lines of the output video signal out of the partial frame line memory.

2. The method of claim 1 including the step of multiplying the output horizontal rate by a number that differs from the selected number of pixels per line to produce a READ pointer signal for reading picture lines of the output video signal out of the partial frame line memory and to adjust the output picture width.

3. A method for converting an input video signal having a first number of scan lines per frame, a horizontal synchronization rate and a vertical synchronization rate on an input video line to an output video signal having a predetermined number of scan lines per frame and a selected number of pixels per line on a video output line, comprising the steps of:
    (a) locking to the vertical synchronization rate of the input video signal to make the output video signal have a vertical synchronization rate equal to the vertical synchronization rate of the input video signal;
    (b) determining a horizontal synchronization rate for the output video signal;
    (c) storing a selected number of lines of the input video signal in a partial frame line memory under the control of a WRITE pointer signal derived from the input horizontal synchronization frequency; and,
    (d) reading lines of the output video signal from the partial frame line memory under the control of a READ pointer signal derived from the horizontal synchronization rate for the output video signals.

4. The method of claim 3 wherein the step of determining a horizontal synchronization rate for the output video signal includes the step of multiplying the vertical synchronization rate by the number of scan lines per frame.

5. The method of claim 3 wherein the WRITE pointer signal is the product of the horizontal synchronization rate of the input video signal and the number of pixels per line in the output video signal.

6. The method of claim 3 wherein the READ pointer signal is the product of the horizontal synchronization rate of the output video signal and the number of pixels per line in the output video signal.

7. A method for converting an input video signal having a first number of scan lines per frame, an input horizontal synchronization rate and a vertical synchronization rate on an input video line to an output video signal having a predetermined number of scan lines per frame and a selected number of pixels per line on a video output line, comprising the steps of:
    (a) locking to the vertical synchronization rate of the input video signal to make the output video signal have a vertical synchronization rate equal to the vertical synchronization rate of the input video signal;
    (b) multiplying the vertical synchronization rate by the predetermined number of scan lines per frame in the output video signal to obtain an output horizontal rate;

(c) multiplying the input horizontal synchronization rate by the selected number of pixels per line for producing a WRITE pointer signal;

(d) multiplying the output horizontal rate by the selected number of pixels per line to produce a READ pointer signal;

(e) converting the video input signal into a digital video signal in source format;

(f) providing a partial frame line memory for receiving the digital video signal in source format, the horizontal synchronization rate of the video signal input, the horizontal synchronization rate of the video signal output, the WRITE pointer signal and the READ pointer;

(g) driving multiplier and a start of line indicator with the horizontal synchronization pulse of the input to fill a line of the partial frame line memory with a picture line; and (h) reading the picture lines out of the partial frame line memory at the horizontal rate of the video signal output.

8. A scan converter for converting an input video signal having a first number of scan lines per frame, a horizontal synchronization rate and a vertical synchronization rate on an input video line to an output video signal having a predetermined number of scan lines per frame and a selected number of pixels per line on a video output line, comprising:

means for locking to the vertical synchronization rate of the input video signal to make the output video signal have a vertical synchronization rate equal to the vertical synchronization rate of the input video signal;

means for determining an output horizontal rate by multiplying the vertical synchronization rate by the predetermined number of scan lines per frame in the output video signal;

means for multiplying the input horizontal synchronization by the selected number of pixels per line to produce a WRITE pointer signal for writing input picture lines into a partial frame line memory; and means for multiplying the output horizontal rate by the selected number of pixels per line to produce a READ pointer signal for reading picture lines of the output video signal out of the partial frame line memory.

9. The scan converter of claim 8 including means for multiplying the output horizontal rate by a number that differs from the selected number of pixels per line to produce a READ pointer signal for reading picture lines of the output video signal out of the partial frame line memory and to adjust the output picture width.

10. A scan converter for converting an input video signal having a first number of scan lines per frame, a horizontal synchronization rate and a vertical synchronization rate on an input video line to an output video signal having a predetermined number of scan lines per frame and a selected number of pixels per line on a video output line, comprising:

means for locking to the vertical synchronization rate of the input video signal to make the output video signal have a vertical synchronization rate equal to the vertical synchronization rate of the input video signal;

means for determining a horizontal synchronization rate for the output video signal;

means for storing a selected number of lines of the input video signal in a partial frame line memory under the control of a WRITE pointer signal derived from the input horizontal synchronization frequency; and means for reading lines of the output video signal from the partial frame line memory under the control of a READ pointer signal derived from the horizontal synchronization rate for the output video signals.

11. The scan converter of claim 10 including means for multiplying the vertical synchronization rate by the number of scan lines per frame to determine a horizontal synchronization rate for the output video signal 12. The scan converter of claim 10 including means for multiplying the horizontal synchronization rate of the input video signal by the number of pixels per line in the output video signal to produce a WRITE pointer signal.

13. The scan converter of claim 10 including means for multiplying the horizontal synchronization rate of the output video signal by the number of pixels per line in the output video signal to produce a READ pointer signal.

14. A scan converter for converting an input video signal having a first number of scan lines per frame, an input horizontal synchronization rate and a vertical synchronization rate on an input video line to an output video signal having a predetermined number of scan lines per frame and a selected number of pixels per line on a video output line, comprising;

means for locking to the vertical synchronization rate of the input video signal to make the output video signal have a vertical synchronization rate equal to the vertical synchronization rate of the input video signal;

means for multiplying the vertical synchronization rate by the predetermined number of scan lines per frame in the output video signal to obtain an output horizontal rate;

means for multiplying the input horizontal synchronization rate by the selected number of pixels per line for producing a WRITE pointer signal;

means for multiplying the output horizontal rate by the selected number of pixels per line to produce a READ pointer signal;

means for converting the video input signal into a digital video signal in source format;

means for providing a partial frame line memory for receiving the digital video signal in source format, the horizontal synchronization rate of the video signal input, the horizontal synchronization rate of the video signal output, the WRITE pointer signal and the READ pointer;

means for driving oscillator and a start of line indicator with the horizontal synchronization pulse of the input to fill a line of the partial frame line memory with a picture line; and means for reading the picture lines out of the partial frame line memory at the horizontal rate of the video signal output.

* * * * *